Figure 2:
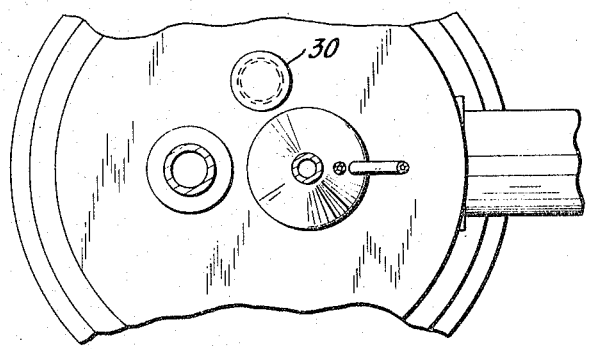

March 7, 1967 A. R. INGRAM 3,307,788
FIELD APPLICATION OF FOAM COATINGS
Filed Dec. 3, 1963

INVENTOR.
ALVIN R. INGRAM
BY Oscar B. Brumback
his Attorney

United States Patent Office 3,307,788
Patented Mar. 7, 1967

3,307,788
FIELD APPLICATION OF FOAM COATINGS
Alvin R. Ingram, Murrysville, Pa., assignor to Koppers Company, Inc., a corporation of Delaware
Filed Dec. 3, 1963, Ser. No. 327,691
1 Claim. (Cl. 239—138)

This invention relates to a method and apparatus for applying thermally insulating, environmentally protective, plastic foam to diverse substrates under a variety of atmospheric conditions.

The methods hitherto known for the field application of synthetic plastic foams to varying substrates and structures have utilized particular foam materials requiring specific processing conditions as well as limited atmospheric conditions. For example, both urethane and epoxy type foams have been sprayed on varying substrates in field applications. However, the use of these foams is limited to temperate or warm climates and to atmospheric conditions of relatively low humidity. Additionally, the mixing and proportioning of catalyst to form the urethane foams are very critical and some of the ingredients used are highly toxic as well as being susceptible to decomposition by moisture.

Because of their excellent thermal and environmental protective characteristics, expanded polystyrene foams have been used in a number of areas to provide protection for certain materials subject to deterioration from changing environments. However, the use of expanded polystyrene foams has heretofore involved considerable expense, because pre-factory fabrication was necessary prior to the use of said foam in the field. Such fabrication requires the use of boards or molded objects made from the expanded polystyrene which have been prepared in factories having a high investment cost in stream pressure molding equipment.

It is, therefore, an object of the present invention to provide a method and apparatus for the field application of expandable polymeric styrene materials to a variety of structures and substrates to provide thermal and environmental protection to said structures and substrates.

A further object of this invention is to provide a method and apparatus for the field application of expandable plastic foams to diverse substrates under normally prohibitive atmospheric conditions using portable, inexpensive equipment and relatively non-toxic, easily available materials.

In accordance with this invention, substrates and structures which are subject to atmospheric and environmental deterioration may be readily protected by spraying the said substrates with free-flowing expanded polymeric particles which have been softened by treatment with a solvent prior to spraying. The expanded polymeric particles may be treated with the solvent by introducing the particles into a spray of solvent directed at the substrate to be covered by the expanded particles. These particles, while traveling in the stream of solvent spray, soften and, on contact with the substrate and with other individual particles contained in the spray, adhere to each other and to the substrate. After deposition of the solvent-polymer material upon the substrate, drying occurs and the substrate is coated with a polymeric foam which has obtained rigidity within a short period of time.

By "substrate and structures" is meant construction materials, automotive equipment, shipping containers, and the like, which are constructed of such varied materials as steel, tin, aluminum, wood, and the like.

The process and apparatus of this invention makes it possible to attain a considerable savings in working time as compared with the methods hitherto known; moreover, it presents appreciable technical advantages in that a complete protective envelopment of substrates or structural materials under temperatures and atmospheric conditions ranging between the arctic and tropical regions can be accomplished.

Expandable polymeric particles for use with this invention are generally available commercially as discrete polymeric particles having incorporated therein a low boiling, aliphatic hydrocarbon, or similar foaming agent which decomposes at a temperature below the melting point of the polymer to produce the requisite expanding action. They must expand in air at about 80–110° C. to yield free flowing foam particles. Polymers of this type include polystyrene, polyvinyl chloride, polyvinylidine chloride, alkyl substituted styrene, polyacrylic esters and polymethacrylic esters, copolymers and terpolymers of styrene and alpha-methyl styrene and acrylonitrile and also alkyl substituted styrene and vinyl toluene, copolymers of styrene with small amounts of divinyl benzene, and styrene in compositions having at least 50 percent styrene. The expansion of said particles may be readily produced by heating the particles in unconfined space. Thus, the expansion of the particle may be accomplished, for example, by placing the particles in a chamber above boiling water. The heat from the boiling water will cause the low boiling foaming agent to exert the requisite expanding action within hte expandable polymeric particles.

This invention contemplates the formation of protective layers of expanded polymeric particles that are bonded to each other to produce a rigid protective layer capable of providing thermal and environmental protection to varying substrates in the field at temperatures which may range from as low as —40° F. to as high as 110° F. During the spraying step, the coating to be applied to a substrate material may vary in thickness and is only dependent upon that desired to provide protection under the existing temperature and atmospheric conditions.

The spraying apparatus consists of a spraying gun to which a gasoline, alcohol, propane, or the like burner is coordinate and is used as a source of heat; a chamber to boil water (which may contain anti-freeze to raise the boiling point and lower the freezing point of the water); a second chamber generally suspended above the boiling water containing a cylinder of solvent and expandable polymeric particles to simultaneously expand the polymeric particles and heat said cylinder of solvent to a constant pressure; and a discharge port from which simultaneously are propelled heated solvent vapors and expanded particles; the particles being sucked out of the chamber by a vacuum created by the expanding vapors passing through a venturi-type nozzle.

Figure 1:
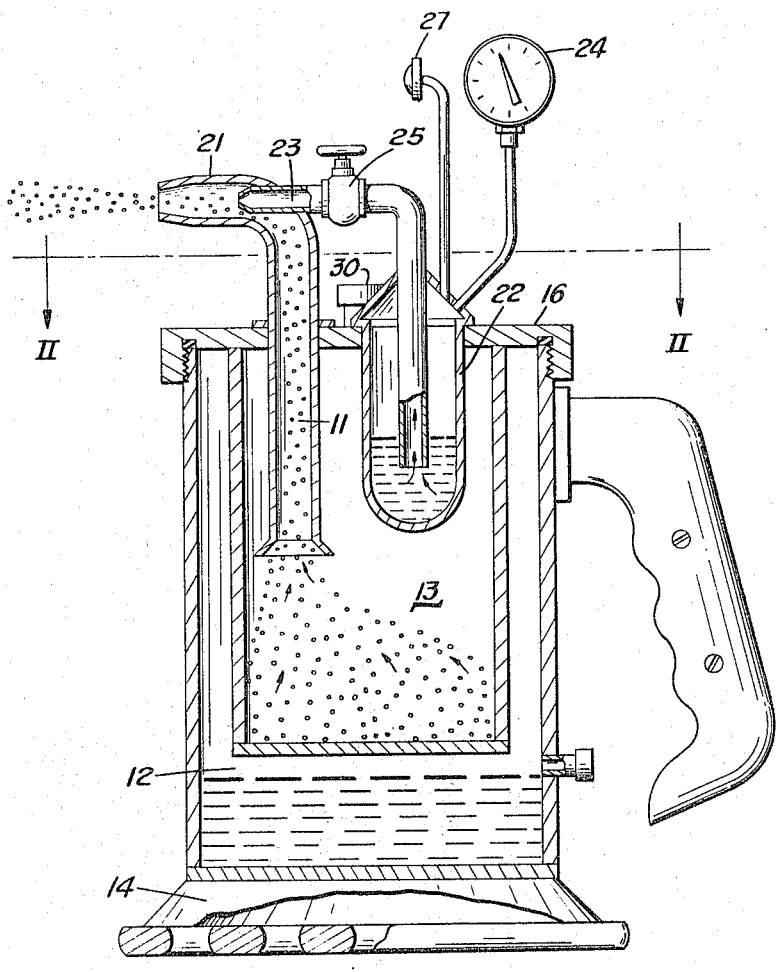

An apparatus for carrying out the process according to this invention is illustrated by way of example by reference to the following detailed description when considered in connection with the accompanying drawings in which like reference numerals designate like parts and wherein FIGURE 1 schematically illustrates the equipment for expanding and spraying the polymeric particles; and FIGURE 2 is an overhead view showing the spray head attachment and the charge-in port.

In FIGURE 1 is shown schematically the apparatus for expanding and depositing polymeric particles such as polystyrene beads wherein the unexpanded polymeric particles are heated.

The apparatus comprises a chamber 12 for containing heatable liquids for heating expandable polymeric particles and for heating a solvent. A second chamber 13 is suspended within chamber 12 immediately above said heatable liquid. The heatable liquid contained in chamber 12 is exposed to a burner unit 14 which is either attached directly onto chamber 12 or is separate therefrom and may be connected thereby by conventional supporting means (not shown).

Chamber 13 is adapted, by means of angular collars 15 to be removably recessed within chamber 12 for easy attachment to chamber 12 and to facilitate the charging or expandable particles thereto. Cover 16 of chamber 13 has slots 17 and 18 which, during operation, are filled with conduit 20 and spout 21 and removable and adjustable cylinder 22. Removable and adjustable cylinder 22 contains the solvent for softening the expandable particles and for creating pressure and vacuum through nozzle 23 and spout 21. Solvent cylinder 22 is equipped with a pressure gage 24 and a spring loaded valve 25, which can be adjusted to open at any pressure. The nozzle 23 is removably engaged to spout 21. During operation, solvent passes from cylinder 22 through pipe 26 and into nozzle 23 which guides the solvent to be sprayed through spout 21. The pressure forcing solvent through spout 21 and nozzle 23 creates a vacuum whereby expandable particles are solvent softened and withdrawn through conduit 11 to simultaneously spray solvent treated particles onto a desired substrate.

The sides of conduit 11 slope away from each other approaching the bottom of chamber 13 leaving an entry hole or slot at the under side thereof, permitting easily controlled passage of the expanding beads into conduit 11.

During operation of the spraying unit, expanded beads are sucked through conduit 11 into spout 21 directly in line with nozzle 23. By this expedient the expanded particles are transferred under pressure from chamber 13 to spout 21 through conduit 11 into a stream of solvent.

Spout 21 is used for directing the stream of expanded particles being deposited on a substrate and for coating the expanded particles with a solvent after the particles have entered the spout. To accommodate both the expanded particles and the solvent, nozzle 23 is used in conjunction with spout 21. The nozzle 23 is supplied with pressurized solvent and is surrounded by, and substantially concentric, with spout 21 of relatively large cross section. Spout 21 ejects expanded particles received from conduit 11 along with a stream of solvent from pressurized nozzle 23. The solvent and particle spray streams merge in a zone forward of the nozzle head (as shown in FIGURE 1) thereby allowing the solvent-treated particles to travel to the target as discrete particles.

Nozzle 23 and spout 21 are interconnected by means of screw threads or other like attaching means so that either may be easily disconnected from the other.

Solvents advantageously used in the practice of this invention must have certain properties; they must soften slightly the expanded particle being used; they must have a boiling point of about 5° C–25° C. above the ambient temperature; they must be able to dry quickly providing a good bond for the expanded polymer particles; and they must be a solvent compatible with the beads so that they only soften and assist in the fusion of the beads, one to another without further collapse of the foam structure. As an example, methylene chloride and expandable particles which are obtained by the aqueous suspension copolymerization of 65 parts of styrene and 35 parts of acrylonitrile in the presence of 10 parts of pentane were sprayed on a steel wet-cell battery case under ambient temperature and humidity conditions. The particles softened were adhered completely to one another and to the battery case. The beads became rigid within thirty minutes after spraying and provided a complete protective coating to the battery case. These expandable particles are incompletely soluble in chloroform, yet are entirely dissolved by dimethylformamide. The acrylonitrile content is 32 percent by weight of the non-volatile portion. Other solvents having the properties enumerated above are, of course, equally applicable and include dichloromonofluoromethane, trichlorofluoromethane, dichlorodifluoromethane, 2-chloropropane, methylene chloride, 1,1,2-trichlorotrifluoroethane, acetone, and chloroform.

A proper balance of solvency (to make the foam surfaces stick together) and non-solvency to avoid collapsing the foam is arrived at in the following manner: (a) by mixing weak solvents or non-solvents (e.g., n-pentane, isopentane, methanol and the like) with strong solvents, or (b) by heterogeneous polymers comprising a solvent-resistant portion which prevents the foam from collapsing plus a soluble part which is softened sufficiently to become tacky and thus act as an adhesive.

Control of the feed and rate of spraying is accomplished by conveniently locating a spring-loaded valve 25 adjacent to spray pipe 22, this valve being mechanically operable to open or close at any pressure. Rupture disc 27 is located on cylinder 22 to prevent excessive pressure from accidentally overheated solvent. When spring-loaded valve 25 is closed, burner 14 applies heat to the solvent chamber 22 to increase the temperature and vaporize the solvent contained within chamber 22, and to thereafter open spring-loaded valve 25 whereby vaporized solvent is forced from solvent chamber 22 through pipe 26 under pressure for release through nozzle 23. Control over the quantity of expandable particles supplied to spout 21 is exerted by controlling the temperature of the liquid heating the expandable particles. By reducing the temperature of the solvent passing through pipe 26 the quantity of particles delivered is decreased. Coordination of the quantity of particles delivered to conduit 11 and spout 21 with the amount of solvent released through nozzle 23 requires simple adjustment.

In FIGURE 2 is shown an easily accessible port 30 for charging expandable particles into chamber 13.

When the volatile components of the solvent employed in softening the expanded polymer, have evaporated, the layer of adhered expanded polymer is completely cured and forms a protective coating to the substrate to which the particles have been applied.

This invention contemplates a method and an apparatus capable of forming lightweight discrete expanded polymeric particles that are bondable to each other to produce a rigid coating material to protect substrates from environmental deterioration in a variety of temperature and humidity conditions.

I claim:

Apparatus for spraying solvent softened expanded polymeric particles onto diverse substrates under a variety of atmospheric conditions, said apparatus comprising a liquid housing including a chamber for containing expandable polymeric particles suspended within said housing and having discharge means for said expandable polymeric particles located in said chamber, cylinder means for supplying a spray of solvent into a nozzle located within said cylinder means for directing said solvent into contact with said particles and heating means attached to said housing for introducing heat into said housing to expand said particles and vaporize said solvent.

References Cited by the Examiner

FOREIGN PATENTS 9,856    1895    Great Britain.

EVERETT W. KIRBY, *Primary Examiner.*